No. 623,621. Patented Apr. 25, 1899.
F. PFEFFER.
WHEEL.
(Application filed Sept. 12, 1898.)
(No Model.)
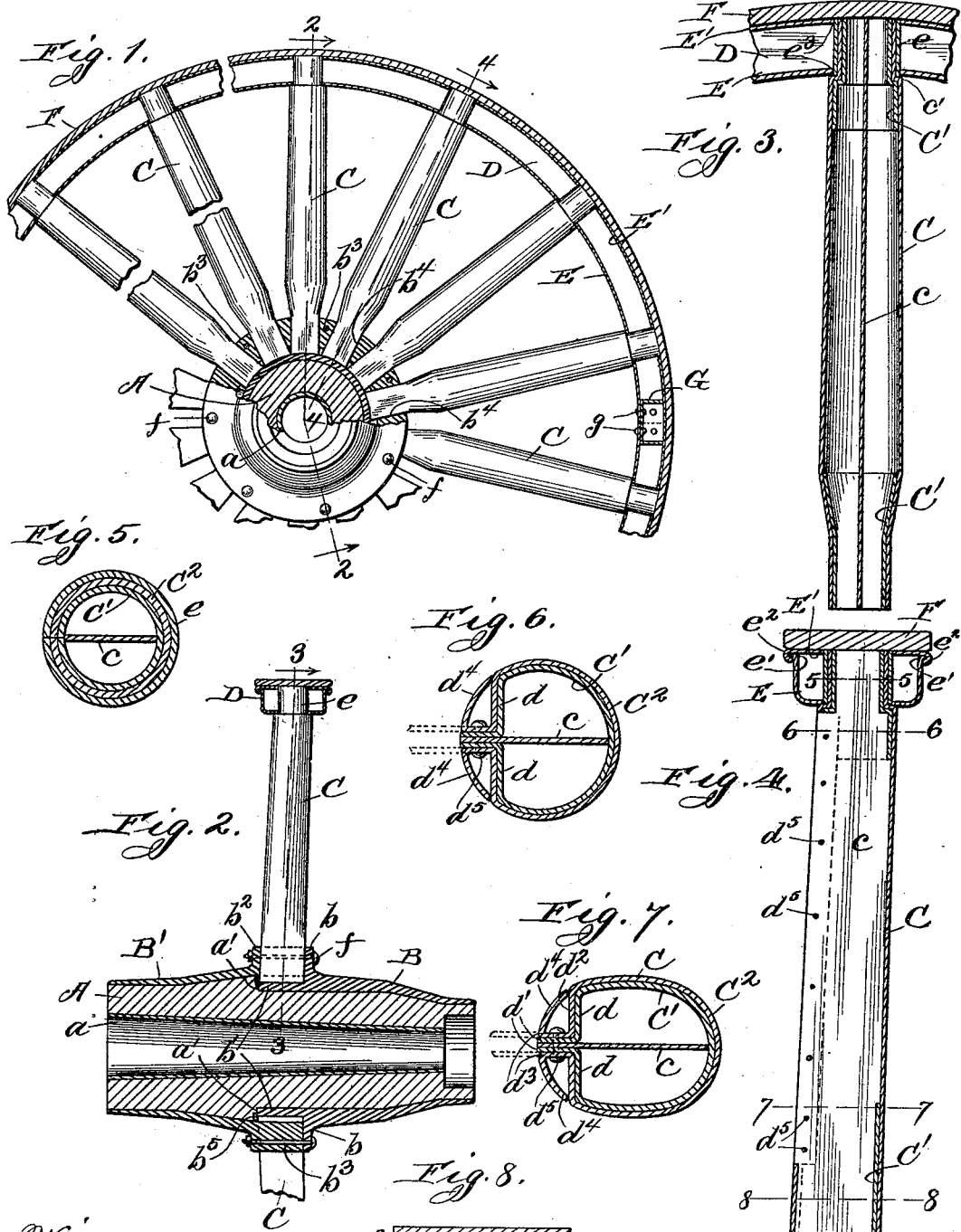
Inventor:
Frank Pfeffer.

UNITED STATES PATENT OFFICE.

FRANK PFEFFER, OF CHICAGO, ILLINOIS.

WHEEL.

SPECIFICATION forming part of Letters Patent No. 623,621, dated April 25, 1899.

Application filed September 12, 1898. Serial No. 690,767. (No model.)

*To all whom it may concern:*

Be it known that I, FRANK PFEFFER, a citizen of the United States, residing at Chicago, in the county of Cook and State of Illinois, have invented certain new and useful Improvements in Wheels, of which the following is a specification.

This invention relates to improvements in wheels, and while it is applicable to wheels of various kinds yet it is more particularly designed for use in the construction of vehicle-wheels; and it consists in certain peculiarities of the construction, novel arrangement, and operation of the various parts thereof, as will be hereinafter more fully set forth and specifically claimed.

The objects of my invention are, first, to produce a wheel which shall be simple and inexpensive in construction, strong and durable, yet light in weight, and, second, such a wheel in which by reason of their peculiar construction the parts may be easily assembled in such a manner as to afford a wheel of great durability and strength.

In order to enable others skilled in the art to which my invention pertains to make and use the same, I will now proceed to describe it, referring to the accompanying drawings, in which—

Figure 1 is a view, partly in elevation and partly in section, of a portion of a wheel embodying my invention. Fig. 2 is a similar view taken on line 2 2 of Fig. 1 looking in the direction indicated by the arrows. Fig. 3 is an enlarged sectional view of one of the spokes and a portion of the felly and tire, taken on line 3 3 of Fig. 2 looking in the direction indicated by the arrows. Fig. 4 is an enlarged sectional view of like parts, taken on line 4 4 of Fig. 1. Fig. 5 is a cross-sectional view of the outer end of one of the spokes, taken on line 5 5 of Fig. 4. Fig. 6 is a cross-sectional view taken on line 6 6 of Fig. 4; and Figs. 7 and 8 are similar views, taken on lines 7 7 and 8 8, respectively, of Fig. 4 of the drawings.

Similar letters refer to like parts throughout the different views of the drawings.

A represents the hub, which is preferably made of wood and is provided, as usual, with a thimble $a$ for the reception and operation of the axle. Located on one portion of the hub A is a metal collar or sleeve B, which is provided near its inner end with an external annular flange $b$ and with an extension $b'$ at a right angle to the said flange. The free end of the extension $b'$ abuts against a shoulder $a'$ of the hub, as is clearly shown in Fig. 2 of the drawings. On the other portion of the hub A is a sleeve B', which has near its inner end a flange $b^2$ and a series of projections $b^3$, which rest against the flange $b$ of the sleeve B and afford spaces or sockets $b^4$ for the reception of the inner ends of the spokes C, which radiate from the hub. Between the free end of the extension $b'$ of the sleeve B and the flange $b^2$ of the sleeve B' is located a metallic ring $b^5$, which prevents the ends of the spoke coming in contact with the hub, and thus preserves the same against wear on account of any movement which the spokes might have. Each of the spokes C is composed of an inner tube C' and an outer tube C², of sheet metal, which tubes are bent at their inner ends to form a rectangular figure in cross-section, as shown in Fig. 8 of the drawings, to fit within the sockets or recesses $b^4$, formed by the flanges $b$ and $b^2$ and the projections $b^3$ on the latter. Within the inner tube C' and extending the entire length of the spoke is a reinforcing-piece $c$, which is so located that it will present its edges longitudinally with the hub, or, in other words, to the sides of the wheel.

The main portion of each of the spokes is cylindrical, or substantially so, and in order to secure the tubes C' C² and reinforcing-strip $c$ firmly together and to still maintain the circular or cylindrical form of the spokes that portion of the tube C' near the meeting edges of the sheet of which it is composed is bent inwardly, as at $d$, (see Figs. 6 and 7,) and then outwardly at a right angle thereto, as at $d'$, and a portion of the reinforcing-strip placed therebetween. The outer tube C² is formed with like bends $d^2$ and $d^3$ and with an additional portion $d^4$, which is bent back to complete the circle or oval formation of the spoke and to cover and protect the bolts or rivets $d^5$, which are passed through the parts $d'$ and $d^3$ and $c$ and secure them together.

By reference to Figs. 6 and 7 of the drawings it will be understood that the portions $d^4$ of the outer tube may be allowed to remain in the positions indicated by dotted lines until the parts have been secured together by means of the rivets, when said portions may be bent to the positions indicated by continuous lines. That portion of the reinforcing-strip c of each of the spokes extending into the rectangular part or that portion fitting in the sockets of the hub is held in place at one of its edges by means of the meeting edges of the inner tube and there brazed, and in some instances I may braze the parts comprising the spokes throughout its entire length instead of employing the construction illustrated in Figs. 6 and 7 and above described. The outer end of each of the spokes is reduced to form a shoulder $c'$, against which the inner surface of the felly D may rest, and around this reduced portion is placed a collar or band $e$ to strengthen the spokes and to more securely retain them in position in the felly, which is composed of a piece of sheet metal E, preferably U-shaped in cross-section, with outwardly-extending lips $e'$ at its edges to engage the inturned edges $e^2$ of the metallic strip or band E', which comprises the outer portion of the felly and to which the tire F may be secured in any desired manner. The band or strip E', as well as the U-shaped portion E, forming the felly, is provided with openings $e^3$ for the reception of the outer ends of the spokes and to admit of the collar or band $e$ being placed therearound after the spokes have been inserted into the felly. The meeting ends of the felly are secured together by means of a short box-like piece G of substantially the same shape as the portion E, which box-like portion is located within the hollow of the pieces E at their meeting ends and there secured by means of rivets $g$, which pass through the pieces G and E and may be located in the meeting ends of the sections comprising the felly when the portion E is made other than of one piece.

In assembling the parts of my wheel the sleeves B and B' are placed on the hub A and secured together by means of the bolts $f$, which pass through the flanges $b$ and $b^2$, the spaces between the projections $b^3$ on the flange $b^2$ forming sockets or recesses, into which the inner ends of the spokes C are inserted. The outer or reduced ends of the spokes are then placed in the openings of the felly and the sleeves or collars $e$ placed on said reduced portions by being passed through the openings in the piece E' of the felly. The tire is then secured on the outer surface of the piece E' in any desired manner, and it is obvious by reference to Figs. 1 and 3 of the drawings that the inner portion of the felly will rest against the shoulders $c'$ of the spokes.

Having thus fully described my invention, what I claim as new, and desire to secure by Letters Patent, is—

1. The combination with a hub, of two metallic sleeves secured thereon, one of said sleeves having a series of projections on its inner end and spaces between said projections to form sockets for the inner ends of the spokes, a felly comprising a channel-shaped piece, having outturned lips at its edges, and a band or piece having inturned lips to engage those of the channel-shaped piece, said pieces being provided with openings, and a series of spokes located at one of their ends in said openings and at their other ends in the sockets on the hub, substantially as described.

2. The combination with a hub, of two metallic sleeves secured thereon, one of said sleeves having a series of projections on its inner end and spaces between said projections to form sockets for the inner ends of the spokes, said spokes made of sheet metal bent to form a tube, a reinforcing-piece located between the meeting portions of each of the spokes, and a felly secured to the outer ends of the spokes, substantially as described.

3. As an improved article of manufacture, a spoke comprising an inner and outer tube, and a reinforcing-piece located longitudinally therein, all being made of sheet metal, the pieces forming the tubes being bent inwardly near their meeting edges and then outwardly at right angles to said bent portion, and the reinforcing-strip secured therebetween, and the edges of the outer tube bent back, substantially as described.

FRANK PFEFFER.

Witnesses:
  CHAS. C. TILLMAN,
  E. A. DUGGAN.